United States Patent [19]

Katchko et al.

[11] Patent Number: 4,713,410

[45] Date of Patent: Dec. 15, 1987

[54] SILICONE RELEASE COATING EMULSIONS WHICH STRATIFY WHEN BAKED

[75] Inventors: John Katchko, Palatine; Karel Kriz, Mt. Prospect; Thomas H. Plaisance, Wilmette, all of Ill.

[73] Assignee: DeSoto, Inc., Des Plaines, Ill.

[21] Appl. No.: 818,035

[22] Filed: Jan. 13, 1986

[51] Int. Cl.$^4$ ................................................ C08J 0/00
[52] U.S. Cl. .................................... 524/500; 525/443; 525/446; 525/474; 525/509; 525/514
[58] Field of Search ................ 524/500; 525/443, 446, 525/474, 509, 514

[56] References Cited

U.S. PATENT DOCUMENTS

| | | | |
|---|---|---|---|
| 4,320,172 | 3/1982 | Takamizawa et al. | 428/447 |
| 4,370,441 | 1/1983 | Gaske et al. | 524/539 |
| 4,417,006 | 11/1983 | Graziano et al. | 524/435 |
| 4,618,657 | 10/1986 | Katchko et al. | 525/443 |

Primary Examiner—Joseph L. Schofer
Assistant Examiner—J. M. Reddick
Attorney, Agent, or Firm—Dressler, Goldsmith, Shore, Sutker & Milnamow, Ltd.

[57] ABSTRACT

A heat curable aqueous emulsion coating composition is disclosed which is adapted to deposit a release coating which stratifies to allow less silicone to effectively coat a given surface area. This emulsion comprises water containing: (1) a fatty acid or fatty alcohol-containing hydroxy-functional polyester having a hydroxy value of at least about 40 and which is a free flowing liquid at room temperature; (2) a cross-linking agent for said hydroxy resin; and (3) at least one silicone reactive with said hydroxy-functional resin and/or said cross-linking agent to provide a release function. The hydroxy-functional polyester and the cross-linking agent serve to emulsify the silicones in the aqueous phase of the emulsion.

15 Claims, No Drawings

SILICONE RELEASE COATING EMULSIONS WHICH STRATIFY WHEN BAKED

DESCRIPTION

1. Technical Field

This invention relates to silicone release coatings which stratify when baked in order to more efficiently employ the costly silicone materials which they utilize, and is related to the prior application Ser. No. 710,336 filed Mar. 11, 1985, now U.S. Pat. No. 4,618,657.

2. Background Art

Said prior application contemplates various types of coating compositions including solutions as well as solvent-free compositions. Application from a dilute organic solvent solution is the easiest method for applying very thin silicone coatings using relatively simple and imprecise coating methods. However, since EPA requirements demand lower solvent emissions, coaters desire to use 100% nonvolatile solids (NVM) coatings and aqueous emulsion coatings, and these are also contemplated in the prior application.

The 100% NVM silicone coatings are preferred by coaters because heat is not required to remove volatiles, and because cure is more rapid than with the solvated silicone coatings. Also, 100% NVM silicone coatings exhibit much less post curing after removal from the baking oven. However, these 100% NVM coatings are difficult to apply at desired lowered coating weights, such as only 0.4 lbs/3000 sq. ft. while still obtaining a uniform and continuous coating.

Aqueous emulsion silicone release coatings are easier to meter onto the surface being coated since they are applied at 5% to 20% NVM. However, since 80% to 95% of the material applied is water, the heat cost to dry the coated paper is large. Also water is detrimental to the properties of paper, and causes it to curl.

Accordingly, it is desired to apply the silicone release coating from an aqueous emulsion in which the emulsified particles are substantially solvent-free, and in which the solids content of the emulsion is much higher than the 20% nonvolatile content previously employed. In this way one can obtain many of the benefits of both of these systems.

More particularly, this invention provides for the emulsification of 100% NVM silicone release coatings in water, and drastically reduces the amount of water necessary to provide an easily coatable admixture. The heat cost is much lower than with current aqueous silicone emulsions, and the paper exhibits substantially less damage and curl due to wetting. Finally, there is a reduction in the total coating cost since this invention provides for less silicone in the coating while maintaining the same level of release properties.

DISCLOSURE OF INVENTION

In accordance with the invention of the prior application, a heat curable coating composition is provided which is adapted to deposit a release coating which stratifies to allow less silicone (preferably polysiloxane) to effectively coat a given surface area. This composition comprises: (1) an hydroxy-functional resin, preferably an hydroxy-functional polyester resin; (2) a cross-linking agent for the hydroxy resin, preferably an aminoplast resin like hexamethoxymethyl melamine; and (3) at least one and preferably a mixture of at least two reactive silicones. These reactive silicones comprise a hydrogen- or alkoxy-functional silicone in which the alkoxy group contains from 1-4 carbon atoms. When the preferred mixture of two reactive silicones is employed, the hydrogen- or alkoxy-functional silicone referred to can be identified as component (A) and the second silicone is; (B) an elastomeric silicone reactive with the hydrogen- or alkoxy-functional silicone to provide release properties. One or more of the silicones must be reactive with the hydroxy resin and/or the cross-linking agent. The preferred silicones are polysiloxanes.

In this invention, the silicones are in aqueous emulsion and the emulsifying agent is a blend of (A) an hydroxy-functional resin which is a fatty acid or fatty alcohol-containing polyester containing at least 5% of fatty materials, preferably at least 50% thereof, and having a hydroxy value of at least about 40 and which is a free flowing liquid at room temperature (preferably having a number average molecular weight in the range of about 600 to about 1,000); and (B) a cross-linking agent for the hydroxy resin, which is preferably an aminoplast resin like hexamethoxymethyl melamine. This emulsifier also functions to extend the silicones which are employed, just as these agents did in the said prior application. The hydroxy resin constitutes from 50% to 80% of the emulsifier blend, and the aminoplast resin constitutes from 20% to 50% of the emulsifier blend, albeit the hydroxy resin may be the main agent providing the capacity to emulsify the silicone resin or resins.

These emulsifiers, which may be premixed or not as desired to form a blend, are then mixed with water, catalysts and the silicone resin or resins to provide an aqueous emulsion of extended silicone release coating. The weight ratio of emulsifiers to silicones should be in the range of 60% to 95% emulsifiers to from 40% to 5% silicones, preferably from 75% to 90% emulsifiers to from 25% to 10% silicones.

Very little water is required in these emulsions, namely: from 2% to 35%, preferably from 15% to 25%. In general, the more water, the easier it is to apply the emulsion. On the other hand, the more water present, the more heat is needed to remove it and the greater the damage to the paper. The best amount in any given situation balances these divergent factors. As a result, very little heat is needed to remove the water, and the tendency of the coated paper to curl is minimized.

The fatty acid or alcohol-containing polyesters which are used herein are hydroxy-functional polyesterification products of polycarboxylic acids with polyalcohols, the polyalcohol being used in stoichiometric excess over the carboxyl functionality present to provide hydroxy groups for subsequent emulsification and cure. An hydroxy number of at least about 40, preferably from about 75 to about 250, and most preferably from 100 to 200, is appropriate. Typical polycarboxylic acids are phthalic acid, adipic acid, and their anhydrides. Typical polyalcohols are glycerine or butane diol. Typical fatty acids are illustrated by safflower oil or fatty acids contained therein, or stearyl alcohol. The fatty acid or alcohol groups preferably contain from 12-22 carbon atoms. The production of oil modified polyesters and their components are common knowledge in polymer chemistry. The combination of moderate molecular weight, fatty moiety, and high hydroxyl number combine to provide the limited emulsification capacity which is desired herein.

The hydrophilic portion of the polyester is provided by its hydroxy functionality and the hydrophobic portion is provided by the fatty moieties which should be present in an amount of at least 5%. The upper limit of fatty content is determined by the molecular weight and the desired hydroxyl functionality. These polyesters may contain an unsaturated fatty moiety, as is provided by using an unsaturated oil or fatty acid derived therefrom, so as to contain ethylenic unsaturation providing an iodine number of at least 30, preferably at least 80. This unsaturation provides a basis for cure, but one can also cure through the hydroxy functionality, so unsaturation is not essential. The usual oil modified alkyd resins are formed by reacting an unsaturated oil or fatty acid therefrom, such as safflower oil, linseed oil, dehydrated castor oil, soya oil, cocoanut oil, or a fatty acid derived therefrom, with glycerin and phthalic anhydride. A small amount of maleic anhydride is usually included to assist polyester formation.

The cross-linking agent for the hydroxy resin may be anything having a plurality of groups reactive with the hydroxy groups of that resin. The preferred cross-linking agent is an aminoplast resin, like hexamethoxymethyl melamine, and the aminoplast cure of hydroxy-functional resins is conventional and is commonly speeded with an acid catalyst. These catalysts are well known. Para toluene sulfonic acid is a common useful catalyst, and this known class of catalysts is also illustrated in the Examples. Hexamethoxymethyl melamine is a preferred material, but it is especially preferred to employ a completely methylolated, approximately 80% methylated melamine, since these give emulsions which are particularly effective.

Other cross-linking agents for hydroxy-functional resins are also well known, and are best illustrated by phenoplast resins, such as the conventional solvent-soluble phenol-formaldehyde condensates. Tertiary butyl phenol or cresol may be used in place of the phenol in these condensates. Organic polyisocyanates which are blocked to prevent prereaction are also useful, and these are illustrated by the diurethane reaction product formed by reacting two moles of 2-ethyl hexanol with one mole of 2,4-toluene diisocyanate or isophorone diisocyanate. Aminoplast cross-linking agents, phenoplast cross-linking agents and blocked polyisocyanate cross-linking agents are all known for the cure of hydroxy-functional resins. Other hydrophilic cross-linking agents with a plurality of functional groups are also acceptable, such as glycouril and urea resins, epoxy resins and the like.

The reactive silicones (polysiloxanes) which cure to provide a release coating are themselves known. With reference to the use of mixtures, which is preferred, any curable mixture of a hydrogen- or alkoxy-functional polysiloxane and an elastomeric polysiloxane carrying groups reactive with the Si-H or Si-OR groups of the polysiloxane may be used. As previously indicated, R denotes an alkyl or alkoxyalkyl group containing from 1 to 10 carbon atoms. When the substantial absence of organic solvent is desired, the reactive polysiloxanes will comprise: (A) a hydrogen- or alkoxy-functional polysiloxane; and (B) an elastomeric polysiloxane reactive with the hydrogen- or alkoxy-functional polysiloxane to provide release properties. As previously indicated, other silicone or silane materials may be added, but this is not essential.

The Si-H or Si-OR groups are reactive in various ways. The Si-H groups of the hydrogen-functional polysiloxane are reactive with the unsaturation and hydroxy functionality in the oil-modified polyester resin, and with the polysiloxane if it carries unsaturated groups (vinyl groups) or hydroxy groups. This reaction between Si-H and ethylenic unsaturation is known and is normally catalyzed by a platinum-type catalyst. The reaction with hydroxy groups is also known and is normally catalyzed by a metal salt catalyst, as previously illustrated. The alkoxy functionality which may be selected is reactive with hydroxy functionality in the polyester resin and in the polysiloxane, and the tin-type catalyst assists these reactions.

The hydrogen-functional polysiloxane, the alkoxy-functional polysiloxane, the hydroxy-functional polysiloxane, and the vinyl-functional polysiloxane are all available in commerce as easily flowable liquid resins. This enables these to be used in aqueous emulsion.

As pointed out in said Ser. No. 710,336, the silicone component is preferably a mixture of two reactive polysiloxanes comprising: (A) a hydrogen- or alkoxy-functional polysiloxane; and (B) an elastomeric vinyl- or hydroxy-terminated polysiloxane which reacts with the hydrogen- or alkoxy-functional silicone to provide release properties.

Using the hydrogen-functional polysiloxane as illustrative, the hydrogen groups of the hydrogen-functional polysiloxane are reactive with the vinyl groups in the vinyl-terminated polysiloxane and also with the unsaturation in the unsaturated oil. This reaction is catalyzed with a platinum catalyst, such as chloro platinic acid. The hydrogen groups of the hydrogen-functional polysiloxane are also reactive with the hydroxy functionality in the hydroxy resin. The hydroxy groups of the hydroxy resin are reactive with the preferred aminoplast cross-linking agent, and an acid catalyst, such as dodecyl benzene sulfonic acid, is used to encourage this reaction. These several reactions thermoset the stratified release layer at the exposed coating surface and provide the adhesion between the stratified layers which is desired. To further improve the adhesion between the layers, silane coupling agents can be added, these coupling agents being usually trimethoxy silanes containing an amine, mercaptan or epoxy functional group as the fourth substituent on the silane silicon atom, as is known.

The hydrogen groups of the hydrogen-functional polysiloxane are also reactive with hydroxy groups in a hydroxy-terminated polysiloxane, and this reaction is catalyzed with a metal salt where the metal ion is selected from the lead to manganese electromotive force series. This series of metal catalysts is well known and is illustrated by a tin salt of a monocarboxylic or dicarboxylic acid, such as dibutyl tin diacetate.

The permissible variations in the polysiloxanes and the catalysts therefore which may be used herein are more fully described in the aforesaid Ser. No. 710,336, the disclosure of which is hereby incorporated by reference.

The invention is illustrated in the Examples which follow.

EXAMPLE 1

The components listed below were mixed together in the manner to be described to provide an aqueous emulsion having a pot life of about 8 hours.

TABLE

| Component | parts by weight |
| --- | --- |
| 1-polyester-melamine blend | 80.0 |
| 2-water | 23.5 |
| 3-para toluene sulfonic acid | 4.0 |
| 4-2-amino-2-methyl-1-propanol | 1.7 |
| 5-vinyl-functional silicone (see Note 1) | 20.0 |
| 6-hydrogen-functional silicone (see Note 2) | 0.8 |

Note 1: A vinyl-terminated polydimethylsiloxane having a room temperature viscosity of 300 centipoises which may be the Dow Corning product SYL OFF 7600, formerly sold as Q2-7203.
Note 2: A hydrogen-functional polymethylsiloxane polymer having a room temperature viscosity of 35 centipoises which may be the Dow Corning product SYL OFF 7601, formerly sold as Q2-7220.

The amino propanol serves to inhibit polyester-melamine cure until the coating is baked. The polyester resin is detailed at the end of this example.

The emulsifier blend (the polyester-melamine blend) is mixed with each component, one at a time. The water is first added and mixed until the blend is homogeneous. The sulfonic acid and the amino propanol are premixed and then added. Similarly, the two silicone materials are premixed before addition thereof. After the addition of each component, the material is mixed thoroughly to form a homogeneous mixture prior to the addition of the next component.

These emulsions are used by applying them as a coating upon paper in a typical weight of about 1.0 pound per ream (3000 square feet). The emulsion is continuously stirred while it is applied. The applied coating is then cured by passing it through an oven maintained at 150° C. for 60 seconds in a gravity convection oven. At this cure schedule the cure is rapid and one can shortly thereafter overcoat the cured coating with an aggressive pressure-sensitive adhesive.

The total coating nonvolatile range, excluding water is preferably 100%, but minor amounts of organic solvent may be incorporated. On this basis, the nonvolatile range should be at least 75%. Xylene can thus be incorporated with the polysiloxanes when these are of higher molecular weight. Similarly, a small amount of 2-butoxy ethanol may be included with the water to aid film formation. However, solvent is preferably absent, so while small amounts are permissible this represents less preferred practice.

The polyester resin, frequently termed an alkyd resin, used in the above composition is made by heating a mixture of 650 grams of safflower oil and 137 grams of glycerine to 232° C. in the presence of 0.3 gram of reagent grade sodium hydroxide to catalyze an alcoholysis reaction. Alcoholysis is considered complete if a clear solution results when 1 part of alcoholysis product is mixed with either 4 parts of methanol or 1 part of melted phthalic anhydride. About ½ to 1 hour is required to carry out the alcoholysis reaction.

After the reaction mixture is cooled to 140° C., 57 grams of phthalic anhydride and 100 grams of adipic acid are added, and 19 grams of xylene are added to allow water of reaction to be removed by azeotropic distillation. The mixture is then heated slowly to 220° C. and held at this temperature until the polyesterification reaction is complete, as indicated by an acid value of less than 5. The contents of the receiver used to trap water are then removed and most of the remaining xylene are removed by passing dry nitrogen gas through the hot material for ½ hour. The batch was cooled and processed neat to provide an alkyd resin of relatively low molecular weight (Gardner-Holdt viscosity of R), the number average molecular weight is about 805.6. The solids content was 98.31%, so there is little solvent present, and the acid value was 2.8. The hydroxyl value (theoretical) is 136.5.

To provide the alkyd-melamine blend which is used in this Example, 65 parts of the above alkyd resin are mixed with 35 parts of 80% methylated methoxymethyl melamine (American Cyanamid product Cymel 350 may be used) at room temperature.

The pot life for the mixture of this example is 8 hours, and this is adequate for most commercial purposes.

As curing occurs, the mixture becomes incompatible and stratifies. The siloxane layer migrates to the air coating interface, while the extender/emulsifier migrates to the paper-coating interface. As each phase cures to form a crosslinked layer, the coating exhibits very good solvent resistance. Also the silicone layer bonds to the extender/emulsifier layer which eliminates silicone transfer to an adhesive in contact with the extended silicone coating. Hence, the solvent resistance is the result of intra and interlayer bonding. Because of this interlayer bonding, this coating can be used as an intercoat adhesion primer for the silicones on substrates such as Mylar.

The polyester/crosslinker blend fills in imperfections of the basestock and forms a very smooth surface due to the good leveling of the extender/emulsifier resin. Therefore the siloxane only needs to cover a minimized surface area, which reduces the amount of silicone needed. Thus the resin blend of polyester and crosslinker extends the area the silicone can cover and still retain excellent release properties.

The polyester/crosslinker blend forms a barrier coating on porous substrates that prevents the silicones from soaking into the substrate. Thus there are two mechanisms by which the polyester/crosslinker reduces the amount of silicone necessary to cover a given surface area. The polyester/crosslinker minimizes the surface area to be covered, and prevents the siloxane from soaking into the basestock. Together these processes result in a silicone layer that more closely approximates a silicone monolayer. Any pinholes in the siloxane are much less a problem when the silicones are over the polyester/crosslinker layer since the cured polyester/crosslinker layer is a tight release coating by itself.

The extender/emulsifier significantly reduces the amount of water in the emulsion coated. This low water content of the coating emulsion greatly reduces the curl caused by paper wetting. Concurrent with decreased curl, the energy cost is reduced since less water needs to be removed.

The use of the emulsions of this invention enables equipment not designed to meter thin 100% NVM silicone coatings to coat these silicone coatings. Coaters can now obtain the release properties of 100% NVM silicones from aqueous emulsion, without the need for new equipment.

It is also permissible to additionally include other reactive silane or siloxane materials, such as vinyl- or hydroxy-functional siloxanes, to modify the release properties as needed for particular utilities, as is known to the art.

This invention is especially applicable to coating paper, but it is also applicable to plastic surfaces, like terephthalic polyesters (Mylar) and polypropylene, with a release coating, and the conventional release coatings do not adhere well to these surfaces. Some of the release coatings of this invention adhere well to these surfaces, so pretreatment of the substrate surface is not needed. Separation is intended after application, and this usually accompanies the curing reaction in which the silicones react with themselves or one another to increase the molecular weight and complexity of the silicone component to force the silicones to separate from the hydroxy-functional resin. This separation or stratification is easily detected in the cured coating by the high concentration of silicone at the exposed surface of the coating.

From the standpoint of the coated product, the hydroxy-functional resin and its curing agent are concentrated at the substrate surface (in and around the porosities of the paper usually used) and the reacted silicones are concentrated at the exposed surface. Between these concentrations is a gradient in which all of the components (1), (2) and (3) are present and reacted with one another.

What is claimed is:

1. A heat curable aqueous emulsion coating composition adapted to deposit a release coating which stratifies to allow less silicone to effectively coat a given surface area comprising: (1) a fatty acid or fatty alcohol-containing hydroxy-functional polyester containing at least 5% of said fatty material and having a hydroxy value of at least about 40 and which is a free flowing liquid at room temperature; (2) a cross-linking agent for said hydroxy resin; and (3) at least one silicone reactive with said hydroxy-functional resin or said cross-linking agent to provide a release function, said hydroxy-functional polyester and said cross-linking agent serving to emulsify said silicone in the aqueous phase of said emulsion, said emulsion containing water in an amount of from 2% to 35%.

2. A heat curable coating composition as recited in claim 1 in which said composition includes at least two reactive silicones.

3. A heat curable coating composition as recited in claim 1 in which said reactive silicones comprise a hydrogen- or alkoxy-functional silicone in which the alkoxy group contains from 1–4 carbon atoms.

4. A heat curable coating composition as recited in claim 1 in which said composition includes a mixture of at least two reactive silicones including: (A) a hydrogen- or alkoxy-functional silicone; and (B) an elastomeric silicone reactive with the hydrogen- or alkoxy-functional silicone to provide release properties.

5. A heat curable coating composition as recited in claim 1 in which said silicones are polysiloxanes.

6. A heat curable coating composition as recited in claim 1 in which said polyester resin has a number average molecular weight in the range of about 600 to about 1,000, and said cross-linking agent is an aminoplast resin.

7. A heat curable coating composition as recited in claim 6 in which said aminoplast resin is hexamethoxymethyl melamine.

8. A heat curable coating composition as recited in claim 6 in which said hydroxy resin constitutes from 50% to 80% of the emulsifier blend, and the aminoplast resin constitutes from 20% to 50% of the emulsifier blend.

9. A heat curable coating composition as recited in claim 1 in which the weight ratio of said emulsifiers to said silicones is in the range of 60% to 95% emulsifiers to from 40% to 5% silicones.

10. A heat curable coating composition as recited in claim 6 in which the weight ratio of said emulsifiers to said silicones is in the range of from 75% to 90% emulsifiers to from 25% to 10% silicones.

11. A heat curable coating composition as recited in claim 6 in which said water is present in said emulsion in an amount of from 15% to 25%.

12. A heat curable coating composition as recited in claim 1 in which said polyester resin has an hydroxy number of from about 75 to about 250, and includes fatty moieties in an amount of at least 50%, said fatty moieties having a chain length of 12–22 carbon atoms.

13. A heat curable coating composition as recited in claim 12 in which said fatty moieties of said polyester are provided by an unsaturated oil or fatty acid derived therefrom which provides an iodine number of at least 30.

14. A heat curable coating composition as recited in claim 13 in which said polyester has an hydroxyl number of from 100 to 200 and an iodine number of at least 80, and said aminoplast resin is a completely methylolated, approximately 80% methylated melamine.

15. A heat curable coating composition as recited in claim 14 in which said silicones comprise (A) a hydrogen- or alkoxy-functional polysiloxane; and (B) an elastomeric polysiloxane reactive with the hydrogen- or alkoxy-functional polysiloxane to provide release properties.

* * * * *